May 4, 1965  A. SMITH ETAL  3,181,619
POWER DRIVEN LATERALLY SHIFTABLE CULTIVATOR
Filed April 3, 1962  5 Sheets-Sheet 3
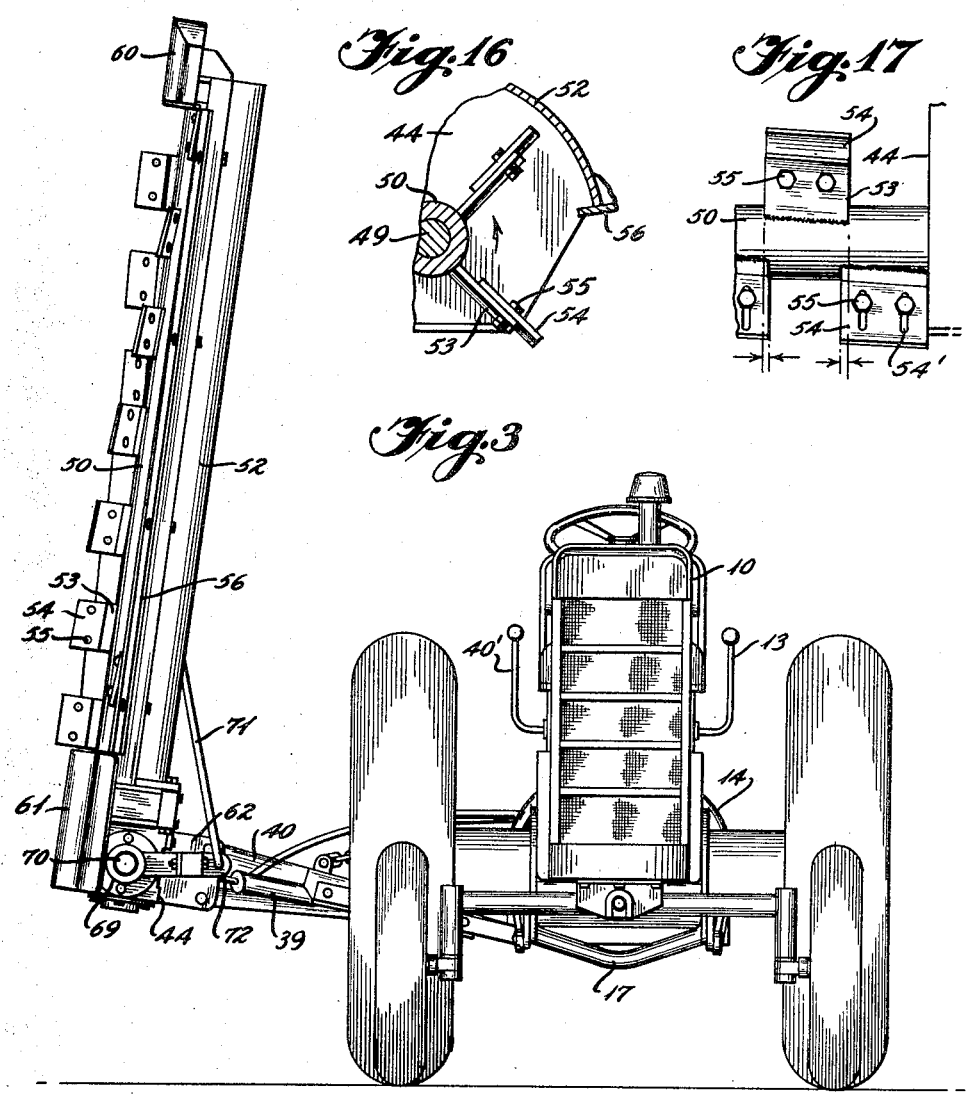
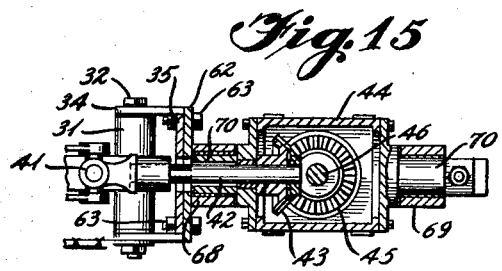
INVENTORS
Alexander Smith &
B. D. Baggs, Jr.
BY
ATTORNEY

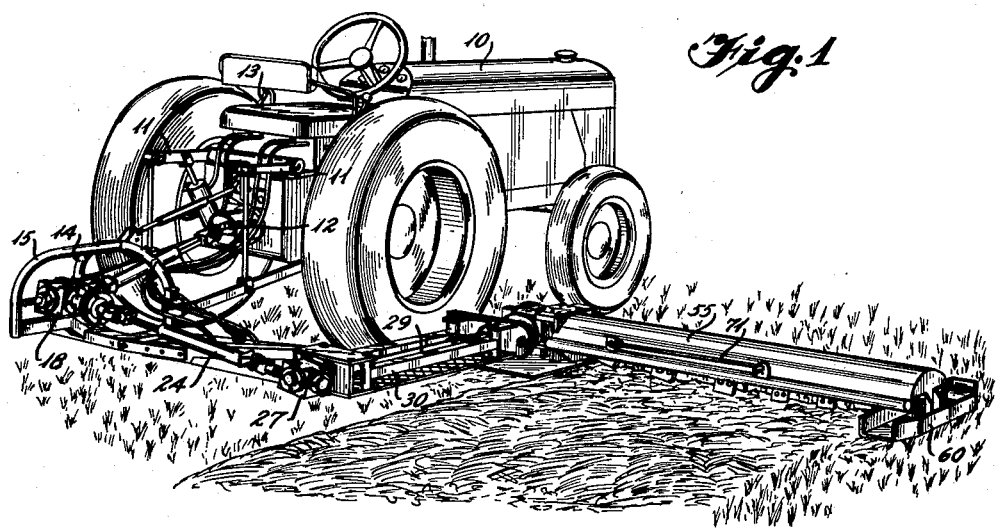
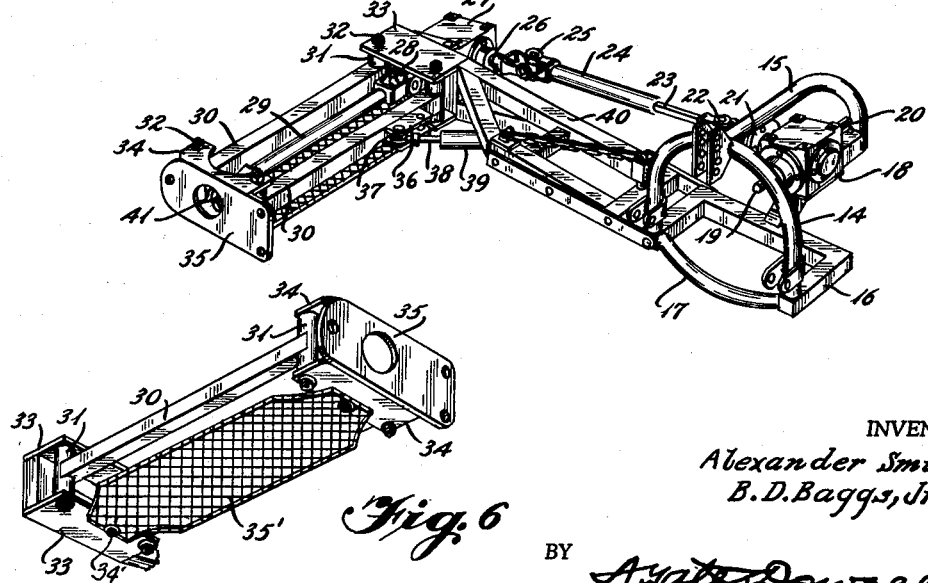

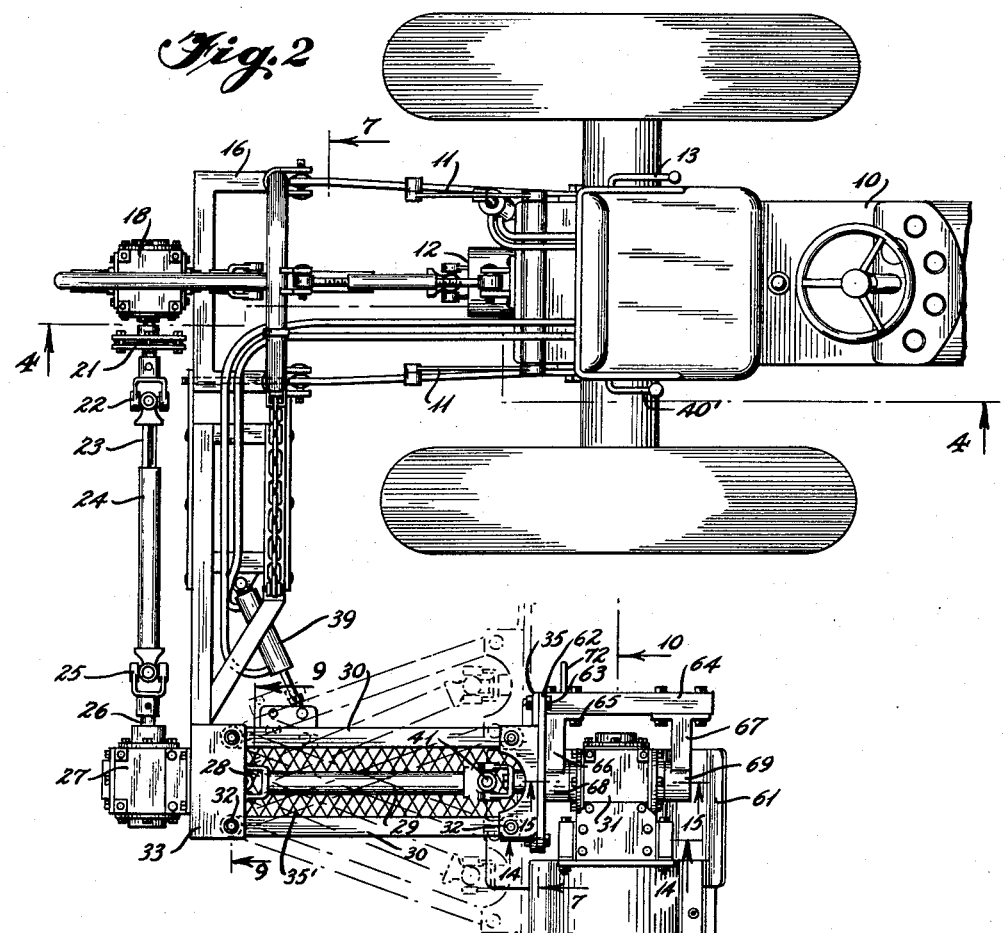
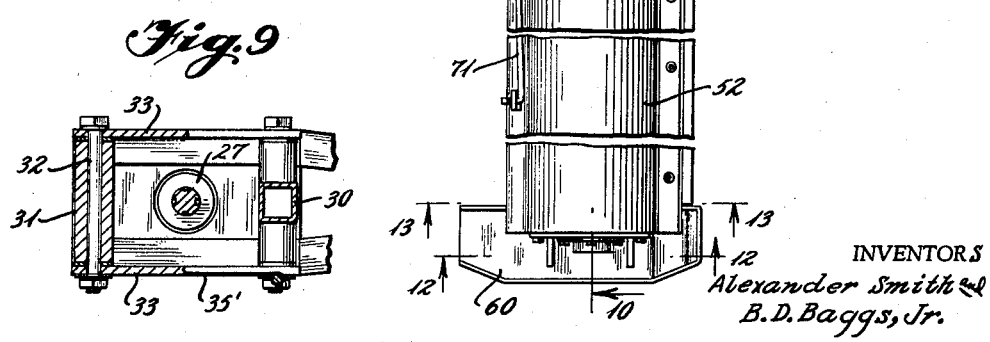

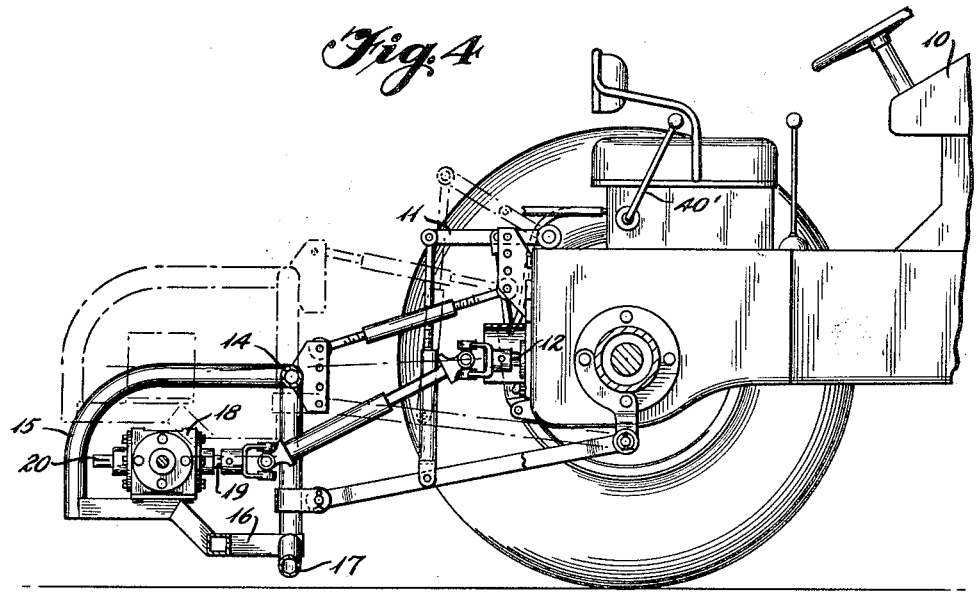
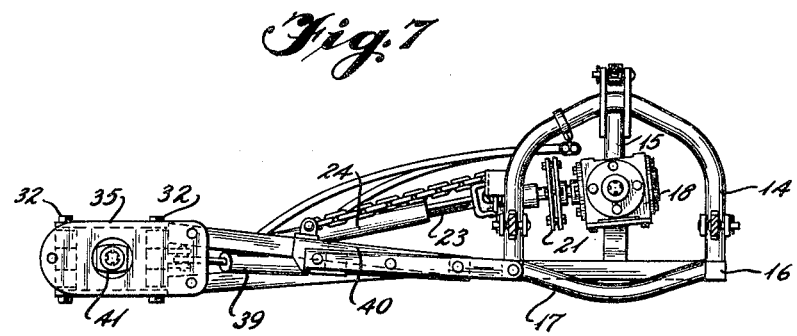
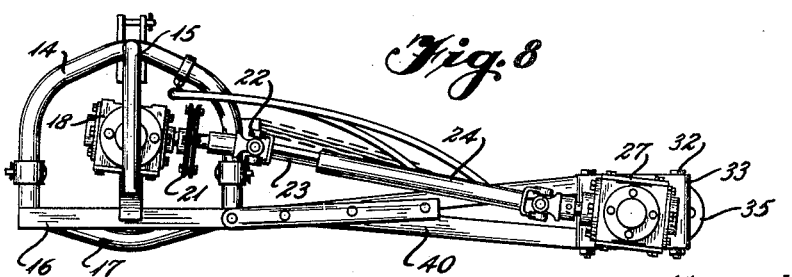

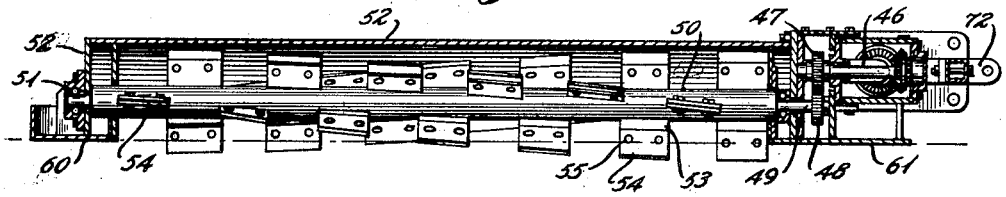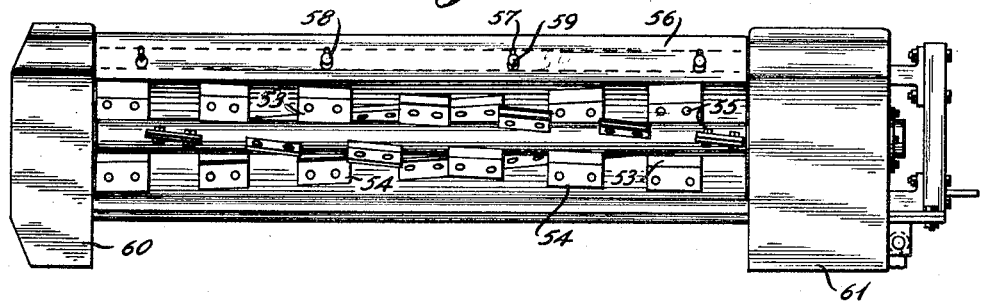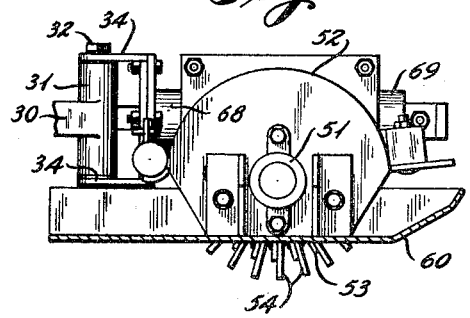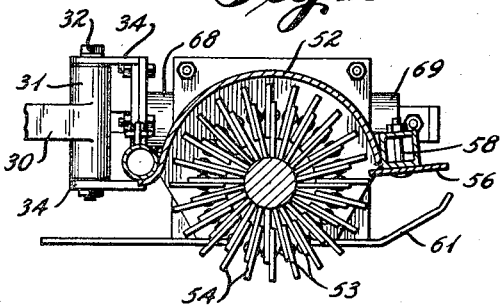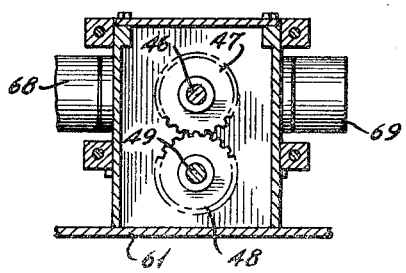
INVENTORS
Alexander Smith
B.D. Baggs, Jr.
BY
ATTORNEY

United States Patent Office

3,181,619
Patented May 4, 1965

3,181,619
POWER DRIVEN LATERALLY SHIFTABLE
CULTIVATOR
Alexander Smith, Box 1460, and Burton D. Baggs,
2429 Laurel Ave., both of Sanford, Fla.
Filed Apr. 3, 1962, Ser. No. 184,857
1 Claim. (Cl. 172—99)

This invention relates to the growth and harvesting of crops and to equipment employed including the mounting and operation in connection with a conventional tractor.

The invention relates particularly to a harvester which can be mounted upon a tractor and utilized for operating upon growth either above or within the soil, and which is capable of being contracted and returned to its initial projected position for avoiding obstructions such as trees and the like when operating in citrus grooves and similar locations.

Various types of mowing or harvesting devices have been designed for operating on growth above or slightly below the surface of the soil, which devices have been mounted upon tractors of various kinds at the side, from the rear of the tractor, and some of such devices have been designed to be drawn towards the tractor and projected outwardly from such retracted position in order to avoid trees and other obstructions. These have been driven in many different ways and have had operating portions of different types of construction. While prior devices have been of value, they have been complicated, excessively heavy, cumbersome, relatively expensive and required a large amount of time in upkeep and operation, and they were not sufficiently flexible to fulfill all requirements for which they were needed.

It is an object of the invention to overcome the difficulties enumerated and to provide a device of simple, relatively inexpensive and foolproof construction in which the cutting blades are reversible and arranged in a manner to prevent vegetation becoming clogged either between the blades or about the shaft on which they are fastened, which can be supported at different elevations, can be disposed in extended position and retracted to avoid an obstruction and returned to its extended position, can be driven in a clockwise or counter-clockwise manner, with mounting means by which it is maintained in a definite transverse position relative to the axis of the tractor on which it is mounted, as well as simple mounting means and with hydraulic means for extending, retracting, raising and lowering from the drive system or power takeoff of the tractor itself, as well as a three-point suspension height adjustment and a height adjustment about a longitudinal axis or an adjustment whereby the angularity of the device can be adjusted to conform to the contour of the area in which operated, as well as mounting and driving means for multiple type apparatus, quick attaching and detaching means.

Other objects and advantages of the invention will be apparent from the following description taken in conjunction with the accompanying drawings wherein:

FIG. 1 is a perspective illustrating the use of the invention as applied to a conventional tractor;

FIG. 2, an enlarged top plan view;

FIG. 3, an enlarged front elevation with the operating member in elevated inoperative position for transportation;

FIG. 4, a section on the line 4—4 of FIG. 2;

FIG. 5, a perspective of the flexible mounting and driving mechanism;

FIG. 6, a detail perspective showing the underside of the drive mechanism;

FIG. 7, a section on the line 7—7 of FIG. 2;

FIG. 8, a rear elevation of the flexible driving mechanism;

FIG. 9, a section on the line 9—9 of FIG. 2;

FIG. 10, a longitudinal section through the cutter mechanism on the line 10—10 of FIG. 2;

FIG. 11, a bottom plan view of the structure of FIG. 10;

FIG. 12, a section on the line 12—12 of FIG. 2;

FIG. 13, a section on the line 13—13 of FIG. 2;

FIG. 14, a section on the line 14—14 of FIG. 2;

FIG. 15, a section on the line 15—15 of FIG. 2;

FIG. 16, an enlarged transverse fragmentary detail of the cutter mechanism; and

FIG. 17, a fragmentary side elevation of the cutter blade mechanism of FIG. 16.

Briefly stated, the invention is a device which can be mounted by means of a three-point hitch on a conventional tractor with the device being readily attachable and removable, can be driven from the power take-off of the tractor, projected outwardly from the tractor and retracted to avoid obstructions, can be supported at any desired elevation, can be moved to conform to the contour of the terrain on which it is operated, can be raised and lowered and its angular position changed, and can be driven in opposite directions.

With continued reference to the drawings, the invention is intended to be applied to a tractor 10 of conventional construction having spaced hydraulically operated lift arms 11 and a power take-off 12 subject to conventional control mechanism including a control lever 13.

A connecting frame is provided for attachment to the tractor hitch and includes a pair of yokes 14 and 15 disposed at right angles one to the other, the yoke 14 being disposed transversely behind the vehicle and attached to a U-frame 16, the free ends of which U-frame 16 are connected by a curved spacer bar 17.

Between the lower end of the yoke 15 and the U-frame 16 is mounted a gear box 18 from which extend shafts 19 and 20, adapted to be driven from the power take-off to provide a drive in two directions. The gear box 18 is adapted to drive through a friction clutch 21 and a universal joint 22, a shaft 23 which telescopes within a complementary sleeve 24 and such sleeve is connected to an additional universal joint 25 for driving a shaft 26 extending into a gear box 27 connected by means of a universal joint 28 to a drive shaft 29.

The drive shaft 29 is mounted between parallel bars 30 connected to sleeves 31 through which pivot bolts 32 extend, upper and lower supporting brackets 33 being provided at one end and corresponding brackets 34 being provided at the opposite ends of the bars 30, such bars forming the sides of a parallelogram so that the brackets 34 and mounting plate 35 connected thereto always are in parallel relation to the brackets 33 and transverse to the axis of the vehicle. If desired a screen 35' may be disposed beneath the lower supporting brackets 33 and 34 and pivotally connected thereto by bolts 34' to guard against rocks being thrown against the drive shaft 29, bars 30 and associated joints.

To one of the bars 30 is welded or otherwise secured a pair of lugs 36 between which is received a pivot pin 37 to which is pivoted a piston 38 extending into an hydraulic cylinder 39 mounted on a support frame 40 which is pivotally connected to the U-frame 16. By the operation of the hydraulic cylinder 39 under the influence of a control lever 40', the shaft 29 can be swung between the parallelogram bars 30 and about the universal joint 28. The parallel bars 30 and brackets 33 and 34 form one leg of a generally L-shaped mounting frame the other leg of which is formed by the support frame 40 and the connecting frame.

The drive shaft 29 is connected by means of a universal joint 41 which drives a shaft 42 and a bevel gear 43 fixed thereto within a pivotally mounted gear box 44. The gear 43 drives a bevel gear 45 fixed on a shaft 46 and such shaft drives a spur gear 47 which drives a meshing gear 48 mounted on a shaft 49 about which is disposed a tubular shaft or sleeve 50. The shaft 49 is mounted in bearings 51 attached to the end of a housing 52.

On the sleeve 50 are located a series of overlapping mounting lugs 53 each set at a slight angle or are spirally arranged along said sleeve so that there can be no space for the accumulation of cut vines, growth, or the like.

Cutting blades 54 are provided having slot 54' for the receipt of bolts 55 by which such blades are attached to the mounting lugs 53. These blades make close contact with a shear bar 56 to provide the necessary shearing action and such shear bar has slots 57 accommodating mounting bolts or fasteners 58 for adjustably attaching the shear bar on the housing 52. The slots 57 have enlargements 59 to permit the heads of the fasteners 58 to pass therethrough and thus permit the application and removal of the shear bar 56.

As the cutter blades 54 wear with use, the shear bar 56 is adjusted to retain close relationship and a satisfactory cutting surface. When the shear bar 56 is moved as far as possible within the limits of the slots 57 the cutter blades 54 are removed and reversed. This provides very inexpensive cutting blades for less than average and the life of which is twice that of a single edge cutting blade.

To the cutter housing 52 are attached outer and inner skid members 60 and 61 which serve to space the cutter housing from the earth or limit the penetration of the cutters into the earth.

In order that the cutter may conform to the contour of the terrain throughout the length of the cutter, pivoting means at the mounting end of the cutter bar is provided, such means including a mounting plate 62 (FIG. 2) which attaches to the plate 35 by means of bolts 63. To the mounting plate 62 is welded or otherwise secured a bar 64 at right angles to such plate, and to this bar are secured by bolts 65 a pair of spaced brackets 66 and 67 having extremities providing bearings 68 and 69 in which are journaled supports 70 to allow the gear box and the cutter bar to pivot to conform to the contour of the terrain. The housing and gear box may be pivoted about the bearings 68 and 69 to an upright position and fastened in such position by means of a hook 71 engaging a lug 72.

It will be apparent from the foregoing that the present invention provides a harvester including projectible and retractible cutting means which can be disposed at the desired elevation and driven selectively in either direction thus to increase the flexibility of the device and its adaptability to a particular situation.

It will be obvious to those skilled in the art that various changes may be made in the invention without departing from the spirit and scope thereof and therefore the invention is not limited by that which is illustrated in the drawings and described in the specification, but only as indicated in the accompanying claim.

What is claimed is:

A cultivator for attachment to a tractor in a manner to extend to one side thereof, said cultivator comprising a first frame connected to and extending transversely to one side of the tractor, a second frame pivotally connected to said first frame and extending forwardly therefrom on an axis generally parallel to the direction of travel for adjustment laterally in a horizontal plane, said second frame comprising a pair of parallel links disposed in a generally horizontal plane, a work unit mounted on the forward end of said second frame, driving means connected to transmit power to said work unit, and control means for producing lateral adjustment of said second frame and work unit.

References Cited by the Examiner

UNITED STATES PATENTS

| | | | |
|---|---|---|---|
| 1,899,439 | 2/33 | Gratiot | 56—294 |
| 2,483,683 | 10/49 | Wells et al. | 56—25.4 |
| 2,592,928 | 4/52 | Martin | 56—23 X |
| 2,725,704 | 12/55 | Skromme | 56—15 |
| 2,745,237 | 5/56 | Elliott | 56—23 X |
| 2,748,679 | 6/56 | Rogers | 172—9 |
| 2,771,829 | 11/56 | Sahlbon | 172—98 |
| 2,790,294 | 4/57 | Marich | 56—294 |
| 2,791,953 | 5/57 | Erickson et al. | 172—98 |
| 2,849,850 | 9/58 | O'Donnell et al | 56—15 |
| 2,865,160 | 12/58 | Farwell | 56—26 |
| 2,920,433 | 1/60 | Brady | 56—24 |
| 2,941,347 | 6/60 | Strom | 56—26 |
| 3,035,393 | 5/62 | Mathews | 56—294 |
| 3,078,929 | 2/63 | Kruse | 172—305 X |

FOREIGN PATENTS

| | | |
|---|---|---|
| 1,257,784 | 2/61 | France. |
| 878,575 | 10/61 | Great Britain. |

T. GRAHAM CRAVER, *Primary Examiner.*

CARL W. ROBINSON, ANTONIO F. GUIDA, ARNOLD RUEGG, *Examiners.*